United States Patent
Barbezat

(10) Patent No.: US 7,390,577 B2
(45) Date of Patent: Jun. 24, 2008

(54) SPRAY POWDER

(75) Inventor: Gérard Barbezat, Opfikon (CH)

(73) Assignee: Sulzer Metco AG, Wohlen (CH)

( * ) Notice: Subject to any disclaimer, the term of this patent is extended or adjusted under 35 U.S.C. 154(b) by 357 days.

(21) Appl. No.: 11/204,650

(22) Filed: Aug. 15, 2005

(65) Prior Publication Data

US 2006/0063020 A1 Mar. 23, 2006

(30) Foreign Application Priority Data

Sep. 17, 2004 (EP) .................. 04405595

(51) Int. Cl.
*B32B 15/18* (2006.01)
*B32B 15/16* (2006.01)
*C22C 38/04* (2006.01)
*C22C 38/16* (2006.01)
*C22C 38/60* (2006.01)
*C23C 4/08* (2006.01)
*C23C 4/12* (2006.01)

(52) U.S. Cl. .................. 428/684; 428/550; 428/685; 75/246; 427/456

(58) Field of Classification Search ............... None
See application file for complete search history.

(56) References Cited

U.S. PATENT DOCUMENTS

| | | | | |
|---|---|---|---|---|
| 4,785,775 A | * | 11/1988 | Dekumbis et al. | 123/193.4 |
| 5,592,927 A | * | 1/1997 | Zaluzec et al. | 123/668 |
| 5,663,124 A | * | 9/1997 | Rao et al. | 508/150 |
| 6,572,931 B2 | * | 6/2003 | Barbezat | 427/453 |
| 6,966,954 B2 | * | 11/2005 | Rhoads et al. | 148/319 |
| 2004/0000283 A1 | * | 1/2004 | Narasimhan et al. | 123/188.8 |
| 2005/0279431 A1 | * | 12/2005 | Daito et al. | 148/593 |

FOREIGN PATENT DOCUMENTS

WO WO 2004/067792 A2 8/2004

OTHER PUBLICATIONS

JP 10-008251 English Abstract, Nakajima et al, Jan. 1989.*
JP 57-165164 English Abstract from DWPI, Oct. 1982.*

* cited by examiner

*Primary Examiner*—Keith D. Hendricks
*Assistant Examiner*—Jason L Savage
(74) *Attorney, Agent, or Firm*—Townsend and Townsend and Crew, LLP

(57) ABSTRACT

The invention relates to a spray powder for coating a substrate (2), in particular for coating a bearing part (2) of a bearing apparatus, the spraying powder having at least the following composition: carbon=0.1% to 1.5% by weight, manganese=0.1% to 8% by weight, sulphur=0.1% to 2% by weight, copper=0.1% to 12% by weight and iron=the balance in % by weight to 100%.

23 Claims, 1 Drawing Sheet

SPRAY POWDER

BACKGROUND OF THE INVENTION

The invention relates to a spray powder, an iron-containing surface layer produced using the spray powder, and also a method for applying such a surface layer.

Bearing apparatus of all kinds, for example sliding bearings (plain bearings) and rolling element bearings, account for the majority of bearings used in technical applications. The term "bearing" or bearing apparatus will be understood in the following to mean all bearing parts defining the function of the bearing, for example bearing parts which roll on each other or slide on each other or are supportingly interengaged with each other and which cooperate in bearing contact.

Signs of wear are as a rule associated with the friction arising at the bearing running surfaces cooperating in bearing contact, in particular on the bearing running surfaces. In order to avoid these signs of wear necessitating a complete exchange of the bearing apparatus, bearing shells are used among other things in sliding bearings, which can be exchanged once they have worn out. However, the constructional design of the sliding bearing is made considerably more complicated by this and, moreover, an expensive servicing process is made necessary for the exchanging of the bearing shells.

Sliding bearings are often used for the journaling of shafts. Combined journaling in sliding bearings and rolling element bearings is sometimes also used. As a rule the bearing parts are manufactured from cast iron with spherical graphite or from heat-treatable steel, or are often manufactured from steel-based or iron-based sintering materials or from malleable iron. The bearing shells are mostly realized from so-called two- or three-layered bearings. The manufacture of such bearing shells is relatively expensive however. With long running lifetimes of the engine the bearing shells eventually wear out to such an extent that changing of the bearing shells becomes necessary, with the changing of the bearing shells in such engines being associated with high costs, as has already been mentioned above.

However in other kinds of bearings as well, for example in ball bearings, the premature wear of the bearing parts, for example of the balls of the ball bearing, of an axle to be supported by the ball bearing, of a cage for the balls of the ball bearing, or of other bearing parts of the ball bearing, is a basic problem which involves considerable repair work and servicing and in the end is associated with considerable costs.

SUMMARY OF THE INVENTION

An object of the present invention is therefore to improve the sliding characteristics of a surface of a bearing part and to propose an improved bearing apparatus which is simpler to design and which has a considerably longer life.

The invention thus relates to a spray powder for coating a substrate, in particular for coating a bearing part of a bearing apparatus, the spray powder having at least the following composition: carbon=0.1% to 1.5% by weight, manganese=0.1% to 8% by weight, sulphur=0.1% to 2% by weight, copper=0.1% to 12% by weight and iron=the balance in % by weight.

A decisive component in this arrangement is the copper which precipitates in a layer sprayed with the spray powder in accordance with the invention on cooling of the liquid powder sprayed onto a workpiece, so that isolated phases arise in the layer, which form correspondingly more or less isolated regions of copper from a spatial point of view. These copper deposits form relatively soft regions, i.e. a region with low hardness in the otherwise relatively hard iron-containing layer.

As will be explained in more detail in the following, the spray powder in accordance with the invention is thus particularly suitable for coating of the surface of a workpiece, the surface cooperating with another surface in bearing contact, since the copper deposits considerably improve the sliding characteristics of the surface layer.

In a preferred embodiment the spray powder in accordance with the invention can additionally contain 0.01% to 0.2% by weight phosphorus and/or additionally 5% to 20% by weight chromium and/or additionally 0.1% to 20% by weight molybdenum.

In order to attain particularly good results in thermal spraying, the particle size is particularly advantageously between 1 μm and 90 μm, preferably between 5 μm and 50 μm.

The spray powder is suited in a particular way for thermal spraying of a surface layer onto a workpiece which cooperates in bearing contact with another workpiece.

In accordance with the invention an iron-containing surface layer which is applied by means of thermal spraying, in particular a bearing layer of a bearing part of a bearing apparatus, has at least the following composition: carbon=0.1% to 1.5% by weight, manganese=0.1% to 8% by weight, sulphur=0.1% to 2% by weight, copper=0.1% to 12% by weight, iron=the balance in % by weight to 100%.

As has already been explained, a surface layer in accordance with the invention has more or less isolated phases which correspondingly form spatially more or less isolated regions made of copper. These copper deposits form relatively soft regions, i.e. regions with a low degree of hardness, in the otherwise relatively hard iron-containing layer. This means that the surface layer has copper deposits which can form a copper matrix. The hardness of these regions out of or with copper can in this arrangement amount to between 80 HV and 200 HV for example, with HV meaning Vickers hardness as usual, and preferably amount to approximately 100 HV, whereas in regions outside the copper deposits, the iron-containing layer can have a hardness between 300 HV and 500 HV, preferably a hardness of approximately 400 HV.

In this arrangement the copper deposits in an iron-containing layer not only result in a considerable improvement in the sliding characteristics, with both dry lubrication but also with lubrication between two bearing parts, which is effected by a lubricant, but also increase the working life of a bearing, the bearing parts of which cooperate in bearing contact. Since the regions which contain the copper deposits have a relatively low hardness, in other words are relatively soft, they can accommodate particularly hard foreign bodies which enter between the bearing parts of the bearing, in that the foreign bodies are pushed into the regions with the copper deposits, so that the surfaces of the bearing parts are protected from damage by the hard foreign bodies. This means that the copper deposits filter out the hard foreign bodies; i.e. the foreign bodies are stored permanently in the copper-containing deposits.

Thus, by way of example, the surface layer of a wet lubricated bearing is particularly advantageously a surface layer made in accordance with the invention. Bearings such as these are as a rule lubricated using a lubricating oil which can contain contaminants of all kinds, such as abrasives for example, which can occur at the most diverse locations in the engine. Corresponding filter devices are often provided, such as the oil filter in a gasoline or diesel engine of a motor vehicle for example; however, only particles from a particular size upwards can be effectively filtered out of the lubricant using these. Smaller particles in the micron range are either not filtered out, or are only filtered out insufficiently, so that they end up between the parts of the bearing which are in bearing contact with each other and can in the long run lead to damage of this bearing. However if the corresponding surfaces are provided with a surface layer in accordance with the invention, the damaging contaminants are stored in the soft copper deposits of the surface layer in operation of the bearing, so that the surfaces which are in bearing contact are not damaged any more by the contaminants, in other words the dirt particles or the foreign bodies.

In this arrangement the surface layer can additionally contain 0.01% to 0.2% by weight phosphorus and/or additionally 5% to 20% by weight chromium and/or additionally 0.1% to 20% by weight molybdenum. In particular the presence of chromium and molybdenum in the surface layer decisively increases its resistance to corrosion, for example against aggressive materials which can be contained in a lubricant for lubricating of a bearing, or which can arise during operation of a combustion engine or end up on the coated surface in another way.

In a preferred embodiment of a surface layer in accordance with the invention MnS is contained as a dry lubricant, with the proportion of manganese amounting to between 1% and 2.5% by weight, preferably amounting to 1.7% by weight, and with the proportion of sulphur amounting to between 0.5% and 1.5% by weight, preferably to 1% by weight, so that particularly bearing parts which cooperate in bearing contact without lubricant, in other words the bearing parts of dry lubricated bearings, can be particularly advantageously provided with a surface layer of this kind. It goes without saying that the dry lubricant MnS can also advantageously develop its lubricant effect in the surface layer in wet lubricated bearings, in other words bearings which are lubricated with oil or grease.

The surface layer preferably includes a base matrix of a-iron, in which regions of deposited copper are embedded.

In this arrangement the surface layer particularly advantageously includes one or more carbides, in particular $Fe_xC_y$, preferably $Fe_3C$. These carbides, which can, for example, be deposited in fine grains in the surface layer, increase above all the mechanical strength of a special surface layer in accordance with the invention, the fine carbide particles preventing the migration of dislocations in the surface layer to thereby mechanically stabilize the surface layer.

In an embodiment of particular importance for practical use, the surface layer has a porosity of between 0.5% and 5% by volume, in particular between 1% and 3%. In the case of wet lubricated bearings in particular this porosity has a very advantageous effect on the sliding characteristics between two bearing parts cooperating in bearing contact, since the pores form storage pockets for lubricating oil so that even under difficult lubricating circumstances, there is always enough lubricant available for lubricating the bearing parts. It has been shown in this arrangement that a porosity of 0.5% to 5% by volume, in particular between 1% and 3%, is particularly effective, so that by this means the lubrication is improved further between the bearing parts, for example not only in the condition of inadequate lubrication but also in the condition of hydrodynamic lubrication.

A surface layer in accordance with the invention is advantageously finished by means of honing in order to increase its quality and/or to adapt to special geometrical requirements.

A particular advantage arises for a bearing apparatus known from the prior art which additionally has a bearing shell between two bearing parts to be supported. Bearing shells are used, as is well-known to the person averagely skilled in the art, arranged between a shaft itself and in a bearing depression or seat which is formed in the bearing saddle. The bearing shells themselves are made from a material which has a lower hardness than the shaft, for example so that the bearing shell is primarily subject to increased wear during operation, so that a corresponding degree of wear on the shaft itself can be reduced and the bearing saddle itself is subject to practically no wear due to friction, since the shaft does not cooperate directly with the bearing saddle, but rather with the bearing shell. This means that it is imperative for a bearing shell to be provided in such bearing apparatus, since otherwise the shaft itself and/or the bearing saddle would wear out in a relatively short time and thus practically the whole bearing with the bearing saddle and the shaft would have to be exchanged, whereas if a bearing shell is additionally provided, only the bearing shell has to be exchanged.

It is obvious that a bearing with bearing shell is comparatively complicated and therefore expensive and also that the exchange of the bearing shells is associated with considerable effort and expense.

However, if a bearing part of a bearing apparatus is, in contrast, provided with a surface layer in accordance with the invention, a bearing shell can be omitted altogether, since the surface layer in accordance with the invention protects the bearing parts from wear so that a bearing shell which serves for the protection of the bearing parts in the known bearing apparatus can be dispensed with.

Finally the invention relates to a spraying method for the manufacture of a surface layer in accordance with the invention using a spray powder in accordance with the invention, wherein the spraying method is a thermal spraying method, in particular an atmospheric plasma spraying method, a vacuum plasma spraying method, a HVOF method, a flame spraying method, or a cold gas spraying method.

BRIEF DESCRIPTION OF THE DRAWINGS

The invention will be described in more detail in the following with reference to the drawings.

DESCRIPTION OF THE PREFERRED EMBODIMENTS

Figure 1:
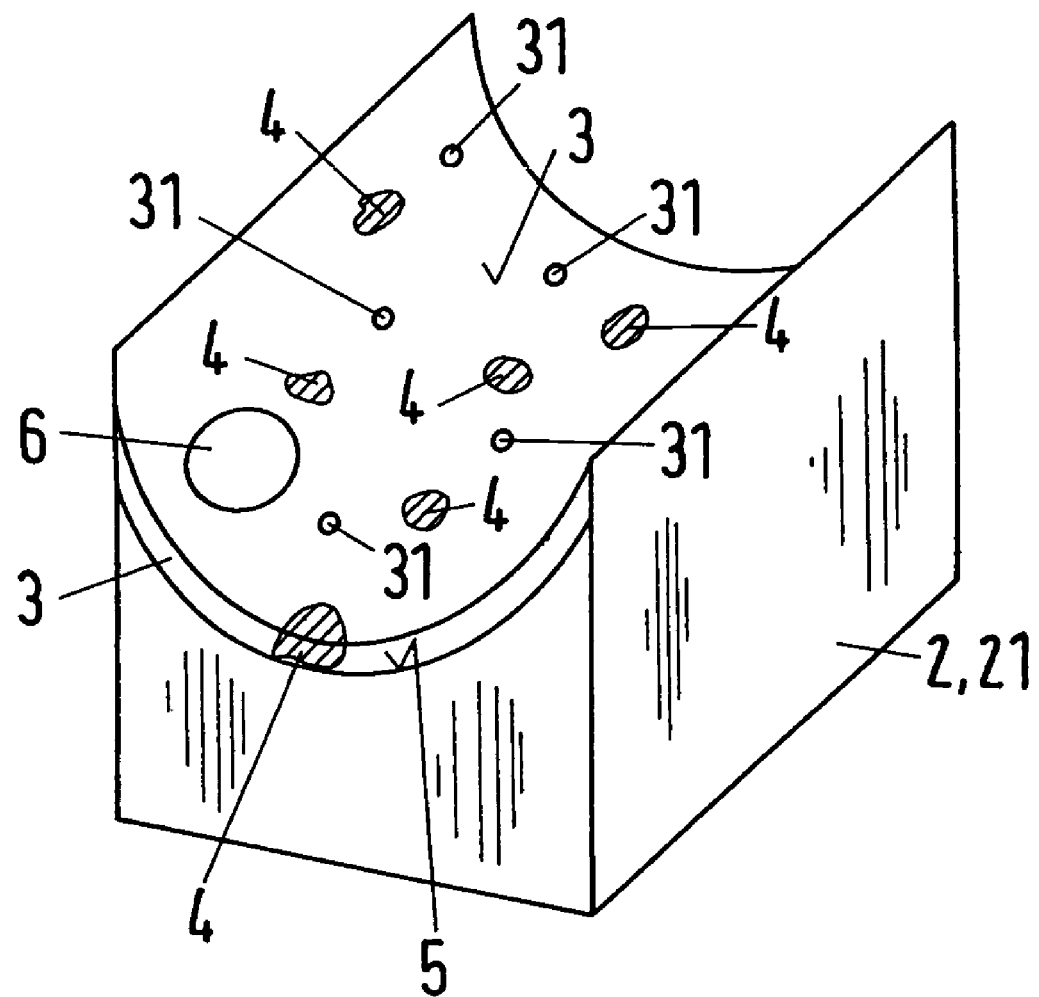
FIG. 1 shows a bearing part of a shaft bearing with a surface layer in accordance with the invention.

FIG. 1 shows in a schematic illustration a bearing part 2 of a shaft bearing with a surface layer 3 in accordance with the invention in section. A section through a bearing saddle 21 of a shaft bearing is illustrated. The bearing saddle 21 has a bearing surface 5 which is provided with a surface layer 3 in accordance with the invention. The surface 3 can for example include a layer of α-iron with fine $Fe_xC_y$,— carbides wherein the surface layer 3 can have an open porosity of 2% for example. The surface layer 3 comprises regions 4 which are formed by deposits made of copper and regions 31 which include MnS, which is a dry lubricant which, on the one hand, increases the sliding ability of a shaft, not illustrated here, on the surface layer 3, and in which, on the other hand, the copper deposits are additionally suitable for incorporating contaminant particles. Contaminant particles can, for example, be supplied to the shaft bearing by a lubricating oil, with the lubricating oil being pressed through the lubricating oil openings 6 in a manner known per se, by an oil pump not illustrated here, between the surface of the bearing saddle 21 and the likewise not illustrated shaft journaled therein. As a result of the surface layer 3 in accordance with the invention a bearing shell is surplus to requirements in the shaft bearing illustrated in FIG. 1, since, on the one hand, the surface layer 3 protects the bearing surface 5 of the bearing saddle 21 from wear in the operating state and, on the other hand, the sliding ability of the shaft on the surface 3 is improved by the copper deposits to such an extent that a bearing shell, such as is known and necessary in the prior art, is no longer necessary.

Thus a copper-containing spray powder for coating a bearing part of a bearing apparatus by means of thermal spraying is made available by the invention. In this arrangement a characteristic sign of the surface layers sprayed with the spray powder in accordance with the invention is that the iron-containing layer in accordance with the invention has regions of copper deposits which not only result in a considerable improvement in the sliding characteristics, both with dry lubrication and also with lubrication between two bearing parts which is achieved by a lubricant, but also clearly increase the working life of a bearing the bearing parts of which cooperate in bearing contact. The reason for this is among other things that the copper deposits embed possible contaminant particles which are located between two bearing parts and by this means bind them so that they are no longer able to cause damaging effects to the surfaces of the bearing parts. In this arrangement the iron-containing surface layer in accordance with the invention has, at the same time, a sufficiently high degree of hardness that the coated bearing part is excellently protected against wear, for example by friction, so that bearing shells which are in particular necessary in shaft bearings or other bearings from the prior art can be dispensed with. Thus, not only is the durability of bearing parts known per se and also that of the corresponding bearings clearly increased as a whole but it also becomes possible to considerably simplify the construction of certain known bearing apparatuses.

The invention claimed is:

1. A spray powder for the coating of a substrate, apart from impurities said spray powder consisting of:
    Carbon=0.1% to 1.5% by weight
    Manganese=0.1% to 8% by weight
    Sulphur=0.1% to 2% by weight
    Copper=0.1% to 12% by weight
    Iron=the balance in % by weight to 100%,
    and at least one element of the group consisting of, phosphorus, chromium and molybdenum.

2. A spray powder in accordance with claim 1 with the spray powder additionally containing 0.01% to 0.2% by weight phosphorus.

3. A spray powder in accordance with claim 1 with the spray powder additionally containing 5% to 20% by weight chromium.

4. A spray powder in accordance with claim 1 with the spray powder additionally containing 0.1% to 20% molybdenum.

5. A spray powder in accordance with claim 1 wherein the spray powder is manufactured by gas nozzling, water nozzling, sintering, spray drying or mechanical alloying.

6. A spray powder in accordance with claim 1, wherein a particle size of the spray powder lies between 5 μm and 90 μm.

7. A spray powder in accordance with claim 6, wherein a particle size of the spray powder lies between 8 μm and 60 μm.

8. An iron-containing surface layer applied by means of thermal spraying, said surface layer consisting of:
    Carbon=0.1% to 1.5% by weight
    Manganese—0.1% to 8% by weight
    Sulphur=0.1% to 2% by weight
    Copper=0.1% to 12% by weight
    Iron=the balance in % by weight to 100%,
    and at least one element of the group consisting of, phosphorus, chromium and molybdenum.

9. A surface layer in accordance with claim 8 with the surface layer additionally containing 0.01% to 0.2% by weight phosphorus.

10. A surface layer in accordance with claim 8 with the surface layer additionally containing 5% to 20% by weight chromium.

11. A surface layer in accordance with claim 8 with the surface layer additionally containing 0.1% to 20% by weight molybdenum.

12. A surface layer in accordance with claim 8 wherein MnS is contained as a dry lubricant and the manganese proportion lies between 1% and 2.5% by weight, and the sulphur proportion lies between 0.5% and 1.5% by weight.

13. A surface layer in accordance with claim 12 wherein the manganese proportion is 1.7% by weight.

14. A method according to claim 12 wherein the sulphur proportion lies at 1% by weight.

15. A surface layer in accordance with claim 8 with the surface layer having a base matrix of α-iron.

16. A surface layer in accordance with claim 8 with the surface layer containing carbide.

17. A surface layer in accordance with claim 16 wherein the carbide is $Fe_xC_y$.

18. A surface layer in accordance with claim 16 wherein the carbide is $Fe_3C$.

19. A surface layer in accordance with claim 8 with the surface layer having copper deposits which occur as isolated phases.

20. A surface layer in accordance with claim 8 with the surface layer having a porosity of 0.5% to 5% by volume.

21. A surface layer in accordance with claim 20 wherein the porosity is between 1% and 3% by volume.

22. A surface layer in accordance with claim 8 which is finished by honing or grinding.

23. A spraying method for the manufacture of a surface layer in accordance with claim 8, with the spraying method being one of an atmospheric plasma spraying method, a vacuum plasma spraying method, an HVOF method, a flame spraying method and a cold gas spraying method.

* * * * *